United States Patent [19]

Dickson

[11] 4,416,505

[45] Nov. 22, 1983

[54] METHOD FOR MAKING HOLOGRAPHIC OPTICAL ELEMENTS WITH HIGH DIFFRACTION EFFICIENCIES

[75] Inventor: LeRoy D. Dickson, Raleigh, N.C.

[73] Assignee: International Business Machines Corporation, Armonk, N.Y.

[21] Appl. No.: 314,645

[22] Filed: Oct. 26, 1981

[51] Int. Cl.³ .................... G02B 27/17; G03H 1/20
[52] U.S. Cl. .................... 350/3.71; 350/162.2
[58] Field of Search .................... 350/3.71, 3.70, 162.2

[56] References Cited

PUBLICATIONS

Lin et al., "Efficient and Aberration-Free Wavefront Reconstruction from Holograms Illuminated at Wavelengths Differing from the Forming Wavelength", Appl. Opt. 10, 1314, (1971).
Malin et al., "Wavelength Scaling Holographic Elements", Optical Engineering, Sep./Oct. 1981, vol. 20, No. 5, pp. 256-258.
George et al., "Holographic Diffraction Gratings", Applied Physics Ltrs., Sep. 1, 1966, pp. 212-215.

*Primary Examiner*—Bruce Y. Arnold
*Attorney, Agent, or Firm*—Gerald R. Woods

[57] ABSTRACT

Production quantities of a multi-element holographic scanner disc are made by optically replicating a silver halide master disc one element at a time in a dichromated gelatin film. The dichromated gelatin film swells during processing. The swell is monitored during production by determining the shift in the angle of the Bragg surfaces within the gel. The angle of the replicating beam for each element is changed from that of the original reference beam to establish a Bragg angle at exposure which will be tilted to the proper angle after swelling in order to maximize the diffraction efficiency of the element at the original reference beam angle.

4 Claims, 6 Drawing Figures

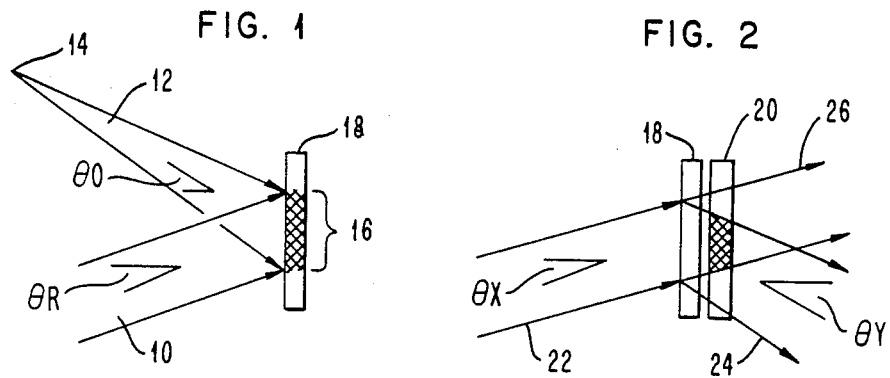
FIG. 1
FIG. 2
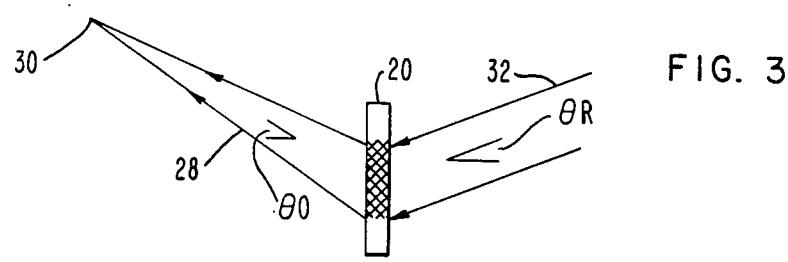
FIG. 3
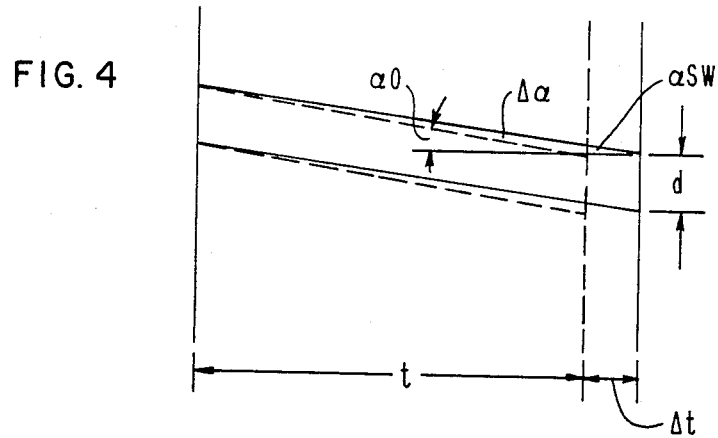
FIG. 4

METHOD FOR MAKING HOLOGRAPHIC OPTICAL ELEMENTS WITH HIGH DIFFRACTION EFFICIENCIES

BACKGROUND OF THE INVENTION

The present invention relates to optical scanners and more particularly to a method for making holographic optical elements with high diffraction efficiencies for use in such scanners.

One of the more significant changes which is occurring in retailing operations in general, and supermarket operations in particular, is the increasing use of optical scanners at customer checkout stations. Such scanners are used to read bar-coded labels which are printed on or affixed to product containers by producers or, in some instances, the store operator.

The bar-coded labels, the best known example of which is the UPC or Universal Product Code label, identify the product and permit the retrieval of product descriptors and prices from a system memory. The product descriptors and prices are used to prepare descriptive customer receipt tapes and to compile transaction totals. The advantages of optical scanners are well known. Since individual containers no longer need be marked, less labor is required to stock and maintain store shelf inventories. Optical scanners can also be used to simplify inventory control, to reduce the chances of operator mis-rings and to improve operator productivity.

Most currently available scanners use rotating mirrored drums or oscillating mirrors to deflect a laser beam onto a stationary set of mirrors which fold the beam along different paths to generate a label-scanning pattern. In recently introduced scanners, the rotating mirrored drums or oscillating mirrors may be replaced by holographic scanner discs. Such discs may include a circumferential array of several holographic optical elements. Each element is a photosensitive film which is a record of an interference pattern originally generated by exposing the film to two overlapping laser beams. Discs made up of circumferential arrays of such elements are potentially much less costly than rotating mirrored drums or oscillating mirror mechanisms, and make it possible to focus scanning beams at different distances.

One available process for making production quantities of multi-element holographic discs requires that a limited number of master discs be prepared. A greater number of copy discs are replicated from each master disc. The master discs are typically made using a silver halide recording material. An interference pattern is recorded in each element of the master disc by interfering a collimated reference beam and a diverging image beam. The angles of the reference beam and image beam are fixed in advance by scanner requirements but are identical to those which are to exist when a copy of the master disc is used in an operating scanner. That is, the angle of the reference beam used in making a master element is the same as the angle of the reconstruction beam which illuminates the copy in an operating scanner. The angle of the image beam used in making a master element is the same angle at which the reconstructed or output beam leaves the corresponding element in a copy in an operating scanner.

When an element in a master disc is formed by interfering the two beams, a series of Bragg surfaces are formed within the recording material. The Bragg surfaces are parallel reflective quasi-planes which extend at an angle generally known as the Bragg angle, to the element surface. The spacing between the planes at the surface of the element is fixed at a distance d in accordance with the grating equation $$\lambda = d(\sin\theta R - \sin\theta O) \qquad \text{Eq. (1)}$$

where
- $\lambda$ is the wavelength of the coherent light beams,
- d is the spacing between adjacent Bragg planes measured along the surface of the recording material,
- $\theta R$ is the angle of the reference beam relative to a normal to the recording medium surface, and
- $\theta O$ is the angle of the image beam relative to the normal.

Production quantities of the holographic optical elements are made by placing an unexposed piece of copy material closely adjacent a developed master holographic element and by illuminating the master element with a coherent light beam. When the beam passes through the master element, a part of it is diffracted or bent while the remainder remains undiffracted, passing straight through the element. The diffracted/undiffracted components of the beam interfere in the copy material to form an interference pattern in that material. The interference pattern is fixed or made permanent by processing the copy material. When the processed copy is illuminated with the coherent light beam, the replicated interference pattern is capable of reconstructing the image beam used in generating the master element.

The recording material used in making the master element and the copy elements may be identical. Similarly, the wavelength of the coherent light beams used in making the master elements and copy elements may also be the same. Preferably, however, the master elements are made by illuminating silver halide films with a laser beam having a wavelength in the red range. The interference pattern which is recorded in the silver halide material is fixed by largely conventional photographic processing techniques. The copy material may be a dichromated gelatin material, which is not sensitive to red light. For this reason, the copying is performed with a coherent light beam in the blue or blue-green range. An image is fixed in dichromated gelatin material by washing the material in a series of water and alcohol baths.

One characteristic of dichromated gelatin is that it swells during processing and retains some residual swell normal to the surface after processing and drying. As a result, the recorded Bragg planes become distorted or tilted relative to their orientation at the time of exposure.

If the swelling is ignored and the copy is illuminated with the conjugate of the original reference beam (that is, a beam having the same cross-sectional configuration as the original beam, but being directed in the opposite direction) the copy would still refract part of the beam along the angle $\theta O$. However, the diffraction efficiency of the element would be significantly reduced; that is, a greater portion of the beam would pass straight through the element while a lesser portion would be bent along the angle $\theta O$. For reasons of scanner performance, it is important that the diffraction efficiency of each copy element be made as high as possible.

Attempts have been made to overcome the problem of reduced diffraction efficiencies due to swell by eliminating the residual gelatin swell through a series of chemical soaking steps. These attempts have only been marginally successful since swelling cannot be completely eliminated. Moreover, the steps are hard to control and the results have been erratic.

Other attempts have been made to solve the problem by changing the angle of the reference beam which is used in making a master to compensate for the Bragg angle tilt resulting from the swelling. Unfortunately, this approach causes distortion of the output beam which is undesirable since it may impact the performance of the scanner.

SUMMARY OF THE INVENTION

The present invention is a method of making holographic optical elements with high diffraction efficiencies and low beam distortion characteristics. An interference pattern previously recorded on a master element is optically replicated onto a closely adjacent, unexposed copy element made of a material which is known to change in thickness as a result of its post-exposure processing. The interference pattern recorded in the master element consists of parallel Bragg surfaces oriented at a desired angle relative to the master element surface. The method is characterized by the steps of illuminating the master element with a coherent replicating beam which is at an angle which establishes Bragg surfaces within the copy material at an intermediate angle relative to the copy material surface. The intermediate angle is different from the desired final angle of the Bragg surfaces. The copy material is then processed to fix the Bragg surfaces. The residual post-processing swell tilts the Bragg surfaces to the desired final angle.

BRIEF DESCRIPTION OF THE DRAWINGS

While the specification concludes with claims particularly pointing out and distinctly claiming that which is regarded as the present invention, details of one embodiment of the invention may be more readily ascertained from the following detailed description when read in conjunction with the accompanying drawings wherein:

FIG. 1 is an optical schematic diagram of the beam configurations and shapes used in generating a master element;

FIG. 2 is an optical schematic diagram of the beam paths during the step of copying the master element;

FIG. 3 is an optical schematic diagram of the beam paths during the use of a copy element to reconstruct an image beam;

FIG. 4 is a representation of a cross section of copy material showing the effects of material swell on the angle of the Bragg surfaces within the material;

DETAILED DESCRIPTION

Figure 5:
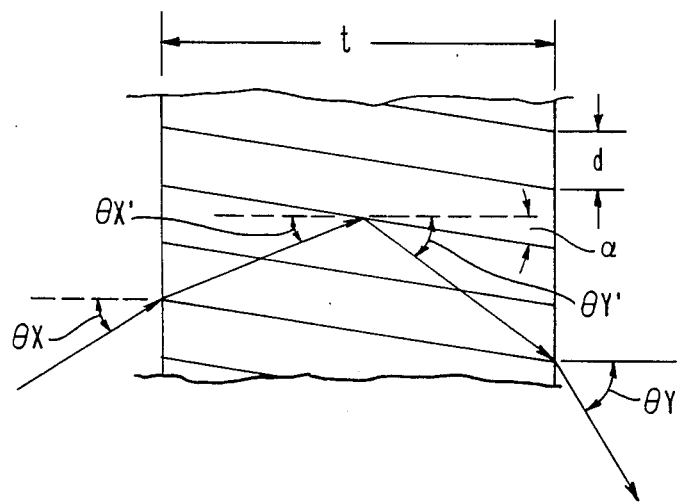
FIG. 5 is a simplified cross section of recording material that is used to define a number of terms.

Referring to FIG. 1, production quantities of holographic optical elements are made by a process which starts with the preparation of a master element. A photosensitive film, such as a silver halide photographic emulsion, is exposed to a coherent reference beam 10 and a coherent image beam 12, both of which are derived from a single coherent light source through conventional beam splitters and mirrors. Preferably, the reference beam 10 is collimated while the image beam 12 diverges from a point source 14. Point source 14 may be a pinhole in the path of the beam 12.

The beams 10 and 12 overlap or interfere in region 16 of the photosensitive emulsion 18 to create a fringe pattern within the film. The pattern takes the form of parallel reflective or Bragg surfaces having an orientation which depends upon the angle $\theta R$ of the reference beam and the angle $\theta O$ of the image beam as measured along normals to the emulsion surface. Where the emulsion is a silver halide photographic emulsion, the interference pattern can be fixed or made permanent by conventional photographic development processes.

Referring to FIG. 2, the master element 18 can be used to prepare a copy element 20 capable of reconstructing the image beam 12. An unexposed sheet of photosensitive copy material is placed closely adjacent the developed master element 18. The master element 18 is illuminated with a replicating beam which is a collimated, coherent light beam 22, that impinges on the master element at an angle $\theta X$. When the beam 22 passes through the master element 18, separates into a diffracted or first order component 24 and an undiffracted or O order component 26. For reasons which will be explained in more detail later, the angle of incidence $\theta X$ of the replicating beam and the angle of departure $\theta Y$ of the diffracted beam 24 are not equal to the angles $\theta R$ and $\theta O$ of the original reference and image beams, respectively.

The O order beams 26 and the first order beam 24 interfere in the photosensitive copy material 20 to create a fringe pattern in that copy material.

When a dichromated gelatin film is employed, the replicated fringe pattern is amplified and fixed by a series of alcohol and water baths. There is a certain amount of residual swell which cannot be eliminated, even after drying. As will be explained in more detail, the amount of residual swell is taken into account in establishing the appropriate angle of incidence $\theta X$ for the replicating beam. The angle $\theta X$ also takes into account any difference in wavelengths of the replicating beam used to make the copy element and the reference and image beams used to create the master element.

Referring to FIG. 3, the copy element 20 can be used to reconstruct a beam 28 which is the conjugate image of beam 12 used in making the master element 18. Beam 28 will have an angle of departure $\theta O$ equal to the angle of incidence of beam 12 and will converge to a focal point 30 located at the same distance from copy element 20 as point source 14 was located from the master element 18. Beam 28 is generated by illuminating the copy element 20 with a collimated reconstructing beam 32 which is the conjugate of the original reference beam 10. Beam 32 illuminates the copy element 20 at an angle of incidence $\theta R$ equal to the angle of incidence of the original reference beam. Beam 32 is, however, directed along a path 180° from the path of the original reference beam. The coherent light source or laser which produces the reconstructing beam 32 operates at the same wavelength as the laser used to generate the original reference and image beams 10 and 12, respectively.

FIG. 4 illustrates the effects of gelatin swell on Bragg planes shown in a greatly enlarged cross section of a portion of the copy film 20. At the time of exposure, the copy material has a thickness t and Bragg planes which are at a given angle $\alpha O$ relative to a normal to the film surface. In practice, the thickness t of the film is on the order of a few microns. The Bragg surfaces or planes formed within the material extend between opposite surfaces and have a surface spacing d which is fixed in accordance with the grating equation (1) mentioned earlier when the master element is initially made. When the film swells as a result of processing, its thickness is increased by an incremental amount $\Delta t$. Since the spacing d between the Bragg surfaces remains fixed, the effect of swell is to tilt or realign the Bragg planes at an angle $\alpha SW$ relative to a normal to the film surface. The difference between $\alpha SW$ and $\alpha O$ is referred to as $\Delta \alpha$.

$\alpha SW$ should be equal to the Bragg angle or $\alpha$ of the planes which are established when the silver halide master element is made. To establish an $\alpha SW$ at the proper value, an intermediate $\alpha O$ must be established at the time of exposure of the copy element so that the Bragg planes will be tilted to the proper $\alpha SW$ as a result of gelatin swell. The determination of the proper angle $\alpha O$ requires knowledge of both the amount of swell and the wavelength of the replicating beam.

Referring to FIG. 5, the appropriate Bragg plane angle $\theta O$ is established in the copy material at the time of exposure by varying the angle of the replicating beam. FIG. 5 defines a number of terms which will be used in explaining how the appropriate replicating beam angle is determined. $\theta X$ and $\theta Y$ are the angle of incidence and the angle of departure of a light beam incident on the film surface. $\theta X'$ is the angle of the incident beam relative to a normal within the film material. $\theta Y'$ is the angle of departure within the material. $\theta X$ and $\theta X'$ are different where the index of refraction of the film material is not equal to the index of refraction of the medium through which the beam travels before reaching the film. $\theta Y'$ and $\theta Y$ are different for the same reasons. The terms d and $\alpha$ have been defined previously.

In preparing a final copy element, the objective is to establish Bragg planes which would yield an output beam at an angle $\theta O$ at a maximum diffraction efficiency for a given reference beam angle $\theta R$. The angles $\theta R$ and $\theta O$ are the angles of incidences of the reference beam and image beam used in preparing the master element. These angles are fixed by scanner requirements. The Bragg angle $\theta SW$ in the final copy disc must satisfy the Bragg equation $$(\theta Y' - \theta X')/2 = \alpha SW \qquad \text{Eq. (2)}$$

where the angles $\theta Y'$ and $\theta X'$ are measured within the copy material.

The angle of incidence of the beam $\theta X$ which will produce the internal beam $\theta X'$ can be determined from Snell's equation which can be stated as $$n1 \sin \theta 1 = n2 \sin \theta 2 \qquad \text{Eq. (3)}$$

where n1 and n2 are the indices of refraction of two adjacent materials (such as air and glass or glass and gelatin) while $\theta 1$ and $\theta 2$ are the angles of a light beam transmitted through those mediums. Where n1 and n2 are different, a light beam which is transmitted from one medium to the other will be refracted or bent at the interface between the two mediums.

To find $\alpha O$ given $\alpha SW$, knowledge of the spacing d between adjacent Bragg surfaces is required along with knowledge of the relative change in thickness of the gel as a result of processing. An analysis of the geometry of the gel shows the tangent $\alpha SW$ equals $d/(t+\Delta t)$ while tangent $\alpha O$ equals $d/t$. Therefore, (tangent $\alpha SW) \times (t + \Delta t)$ equals (tangent $\alpha O) \times (t)$. For small angles, the tangent of an angle is approximately equal to the value of the angle itself in radians. Therefore, $\alpha SW \times [(t)$ plus $(\Delta T)]$ equals $\alpha O \times (t)$. Solving this equation for $\alpha O$, it can be found that $$\alpha 0 = \alpha SW \left( 1 + \frac{\Delta t}{t} \right) \qquad \text{Eq. (4)}$$

Once $\alpha O$ has been calculated in accordance with this equation, $\theta X'$ and $\theta Y'$ can be calculated by simultaneously solving the following two equations $$d = \frac{\lambda}{\sin \theta Y' - \sin \theta X'} \qquad \text{Eq. (5)}$$

$$\alpha 0 = \frac{\theta Y' - \theta X'}{2} \qquad \text{Eq. (6)}$$

where $\theta X'$ is the angle of the replicating beam within the gel at the time of exposure, $\theta Y'$ is the angle of departure of the replicating beam within the gel at the time of exposure, $\lambda$ is the wavelength of the replicating beam, and d is the surface spacing between adjacent Bragg surfaces.

Once $\theta X'$ and $\theta Y'$ have been calculated, the appropriate angle of incidence $\theta X$ for the replicating beam outside of the gel can be calculated through the use of the following equation where n1 represents the index of refraction of air and n2 represents the index of refraction of the gel.

$$\theta X = \sin^{-1} \left( \frac{n2}{n1} \sin \theta X' \right) \qquad \text{Eq. (7)}$$

If Bragg planes at an angle $\alpha O$ are established in the copy material at the time of exposure, the swell of that material will tilt those Bragg planes to the angle $\alpha SW$. When the copy material is illustrated with a reconstructing beam at an angle of incidence $\theta R$, the output beam will leave the element at an angle $\theta O$ at maximum diffraction efficiency.

Figure 6:
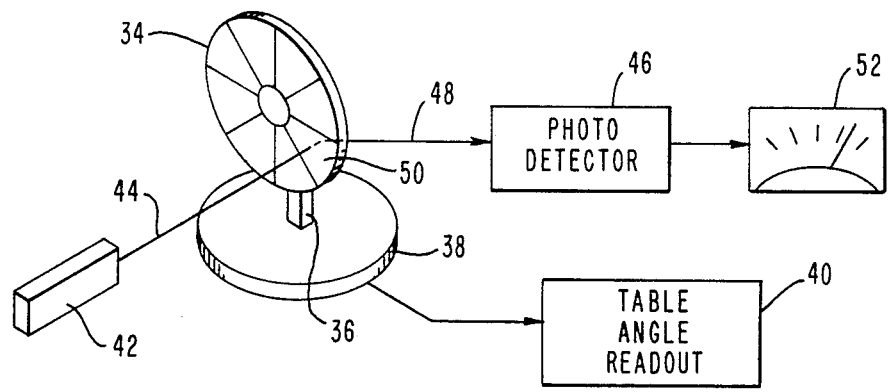
FIG. 6 is a perspective view of an apparatus which can be used to monitor material swell through non-destructive measurements performed on finished discs.

Clearly, calculation of $\theta X$ requires knowledge of the relative amount of swell that can be expected when the copy material is processed. In accordance with this invention, the relative amount of swell is determined by means of optical measurements which are performed on previously produced multi-element holographic discs by means of an arrangement illustrated in FIG. 6.

A finished disc may include on the order of 20 facets or holographic optical elements in an annular film of dichromated gelatin material. The film is sandwiched between two clear glass substrates. The finished disc 34 is mounted on a vertical post 36 located at the center of a graduated rotating table 38. Such a table is marked in degrees or radians and can provide a direct indication through a table angle readout mechanism 40 of the angle of the mounted disc relative to a laser 42.

In use, the position of the rotating table 38 is adjusted so that an output beam 44 from laser 42 strikes the disc surface at a normal, which is indicated when the laser beam is reflected back along its own path. At this point, the table readout would be reset or recalibrated to provide a zero reading. A photodetector 46 is placed in the path of the diffracted or first order beam 48 produced when the laser beam is transmitted through an element 50 on the disc. The element 50 being investigated has its Bragg planes lying in planes parallel to the axis about which the disc is rotated; namely, the axis of the post 36. It should be noted that post 36 is offset from the center of the disc. It is coincident with the center of the element being illuminated; namely, element 50. The output of the photodetector 46 is applied to an indicator such as a voltmeter 52.

The table 38 is rotated about the axis of post 36 until the voltmeter reading is maximized, indicating that beam 48 is being produced with maximum diffraction efficiency. The angle through which the table 38 has been rotated is the angle of incidence for which maximum diffraction efficiency actually occurs.

An alternate technique for establishing the angle $\theta R$ which produces $\theta O$ at maximum diffraction efficiency requires that the maximum voltmeter reading first be noted. The approximate angle at which maximum voltmeter reading occurs is also noted. The rotating table is moved in one direction until the voltmeter reading is 90% of the noted peak value. The first angle $\theta R1$ at which the 90% peak reading occurs is noted. The rotating table is then moved through the peak reading area until a second angle $\theta R2$ is encountered which produces a voltmeter reading at 90% peak value. The average of $\theta R1$ and $\theta R2$ is the angle $\theta R$ at which maximum diffraction efficiency occurs.

Using the grating equation (1) and knowing the angle of incidence, the spacing d for the element 50 and the wavelength $\lambda$ for laser 42, the angle of departure of the diffracted beam 48 can be calculated.

When angles of incidence and departure have been calculated, the Bragg equation can be used to determine the actual SW for the element 50.

As noted earlier, SW is nominally equal to the Bragg angle $\alpha$ established when the master element is made.

The Bragg angle $\theta O$ at the time of exposure can be calculated for the element 50 using the Bragg equation and the grating equation since the actual angle of incidence of the replicating beam for element 50 will be known.

When $\alpha SW$ has been found and $\alpha O$ has been calculated, the following equation can be used to calculate the relative change in thickness or the amount of residual swell of gelatin material as a result of processing:

$$\frac{\Delta t}{t} = \frac{\alpha O}{\alpha SW} - 1$$

This equation is derived simply by rearranging the terms of equation (4).

If the amount of gelatin swell is not changed significantly, no corrections need be made in the angle of the replicating beam. If, however, the amount of swell deviates, the angle of incidence of the replicating beam can be adjusted to produce an $\alpha O$ which will result in the desired $\alpha SW$ in subsequently produced elements.

While there has been described what is considered to be a preferred embodiment of the invention, variations and modifications therein will occur to those skilled in the art once they become familiar with the basic concepts of the invention. Therefore, it is intended that the appended claims shall be construed to include all such variations and modifications as fall within the true spirit and scope of the invention.

Having thus described my invention with reference to a preferred embodiment thereof, what I desire to protect by Letters Patent is:

1. A method of making holographic optical elements with high diffraction efficiencies by optically replicating a previously recorded interference pattern from a master element onto a closely adjacent, unexposed copy element which is known to change in thickness as a result of post-exposure processing, said interference pattern consisting of parallel Bragg surfaces within the master element oriented at a desired angle relative to the master element surface, said method being characterized by the steps of:

illuminating the master element with a coherent replicating beam oriented to initially establish Bragg surfaces within the closely adjacent copy material at an intermediate angle relative to the copy material surface, said intermediate angle being different from the desired final angle of the Bragg surfaces in the copy; and processing the copy material to fix the Bragg surfaces, said Bragg surfaces being tilted to the desired final angle as a result of process-induced changes in the thickness of the copy material.

2. A method as defined in claim 1 wherein the orientation of the replicating beam is also a function of the wavelength of that beam.

3. A method as defined in claim 1 characterized by the additional steps of monitoring the process-induced changes in thickness of previously produced copy elements and adjusting the orientation of the replicating beam to reflect any thickness changes not previously taken into account.

4. A method as defined in claim 3 wherein the steps of monitoring thickness further comprise:

establishing the spacing d and the angle $\alpha O$ of the Bragg surfaces in the copy material at the time of exposure;

illuminating the copy element after processing with a coherent light beam having a known wavelength $\lambda$;

rotating the element about an axis parallel to the plane of the Bragg surfaces and perpendicular to the axis of the coherent light beam while measuring the intensity of the diffracted beam to determine the angle of incidence $\theta R$ at which maximum diffraction efficiency occurs;

determining the angle $\alpha SW$ of the Bragg surfaces in the processed element as a function of $\lambda$, d and the determined angle of incidence $\theta R$; and determining the relative change in thickness as a function of the relative values of the angles $\alpha O$ and $\alpha SW$.

* * * * *